US008839769B2

(12) United States Patent
Sasai et al.

(10) Patent No.: US 8,839,769 B2
(45) Date of Patent: Sep. 23, 2014

(54) FUEL SUPPLY SYSTEM OF INTERNAL COMBUSTION ENGINE

(75) Inventors: Mie Sasai, Susono (JP); Kazuhiro Wakao, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 210 days.

(21) Appl. No.: 13/416,867

(22) Filed: Mar. 9, 2012

(65) Prior Publication Data
US 2012/0227707 A1    Sep. 13, 2012

(30) Foreign Application Priority Data

Mar. 11, 2011    (JP) ................. 2011-053827

(51) Int. Cl.
*F02D 19/08* (2006.01)
*F02M 43/02* (2006.01)
*F02M 63/02* (2006.01)
*F02D 41/00* (2006.01)
*F02M 37/00* (2006.01)
*F02D 41/38* (2006.01)

(52) U.S. Cl.
CPC ........... *F02M 63/0245* (2013.01); *F02M 43/02* (2013.01); *F02D 41/3863* (2013.01); *F02D 2200/0611* (2013.01); *F02D 19/084* (2013.01); *Y02T 10/36* (2013.01); *F02D 41/0025* (2013.01)
USPC ......................................... 123/575; 701/104

(58) Field of Classification Search
CPC ... F02D 19/087; F02D 19/085; F02D 19/084; F02D 19/08; F02M 37/00; F02M 37/10; F02M 37/106
USPC ................. 123/1 A, 575–578, 304, 299, 300; 701/104, 114; 73/35.02–35.06; 702/5
See application file for complete search history.

(56) References Cited

U.S. PATENT DOCUMENTS 4,369,736 A * 1/1983 Ito ................................. 123/1 A
5,044,344 A * 9/1991 Tuckey et al. ................. 123/497

(Continued)

FOREIGN PATENT DOCUMENTS

| JP | 06026414 A | 2/1994 |
| JP | 06-229340 A | 8/1994 |
| JP | 11315744 A | 11/1999 |
| JP | 2005-042649 A | 2/2005 |

(Continued)

*Primary Examiner* — Mahmoud Gimie
(74) *Attorney, Agent, or Firm* — Gifford, Krass, Sprinkle, Anderson & Citkowski, P.C.

(57) ABSTRACT

A fuel supply system of an internal combustion engine includes: a pressure adjustment device provided on a fuel flow path that connects a fuel pump and an injector; a return flow path for returning a fuel discharged from the pressure adjustment device to a fuel tank; a fuel property sensor disposed in the return flow path; a fuel pump control portion that actuates the fuel pump at a predetermined programmed timing, when the internal combustion engine is in a stopped state; and a fuel property determination portion that determines a fuel property of the fuel in the fuel tank by using an output value of the fuel property sensor, when the fuel pump is actuated during the stopped state of the internal combustion engine.

7 Claims, 3 Drawing Sheets

(56) References Cited

U.S. PATENT DOCUMENTS

| | | | |
|---|---|---|---|
| 5,060,619 A * | 10/1991 | Sakurai et al. | 123/494 |
| 5,183,021 A * | 2/1993 | Suga et al. | 123/478 |
| 5,190,014 A * | 3/1993 | Suga et al. | 123/519 |
| 5,934,255 A | 8/1999 | Dalton et al. | |
| 8,474,310 B2 * | 7/2013 | Fujimoto | 73/114.55 |
| 2008/0197863 A1 * | 8/2008 | Lin et al. | 324/693 |
| 2008/0223344 A1 * | 9/2008 | Suzuki et al. | 123/525 |
| 2009/0030588 A1 * | 1/2009 | Yamashita | 701/103 |
| 2013/0263824 A1 | 10/2013 | Wakao et al. | |

FOREIGN PATENT DOCUMENTS

| | | |
|---|---|---|
| JP | 2008-248723 A | 10/2008 |
| JP | 2009133273 A | 6/2009 |
| JP | 2011-111916 A | 6/2011 |
| WO | 2012090315 A1 | 7/2012 |

* cited by examiner

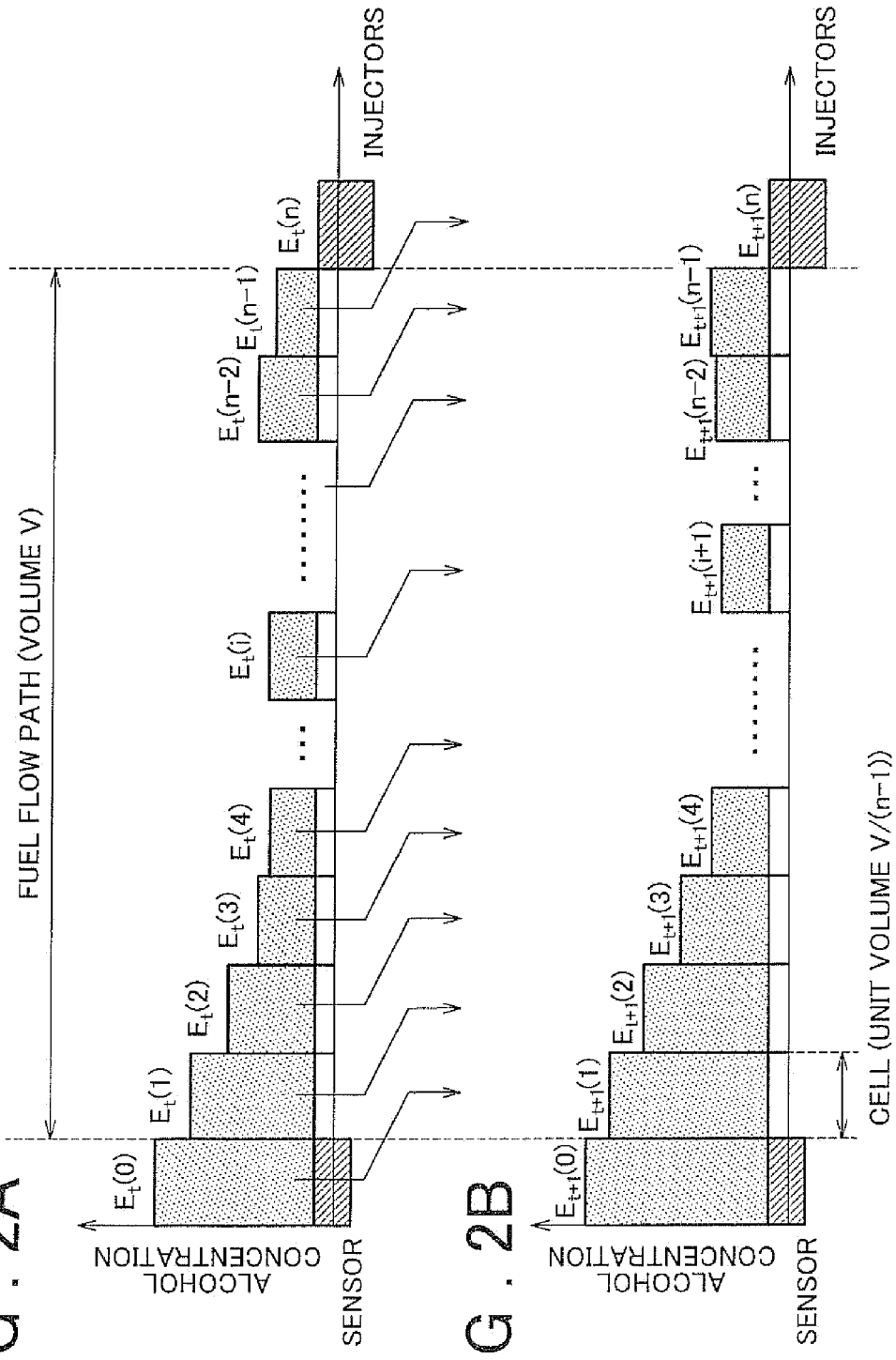

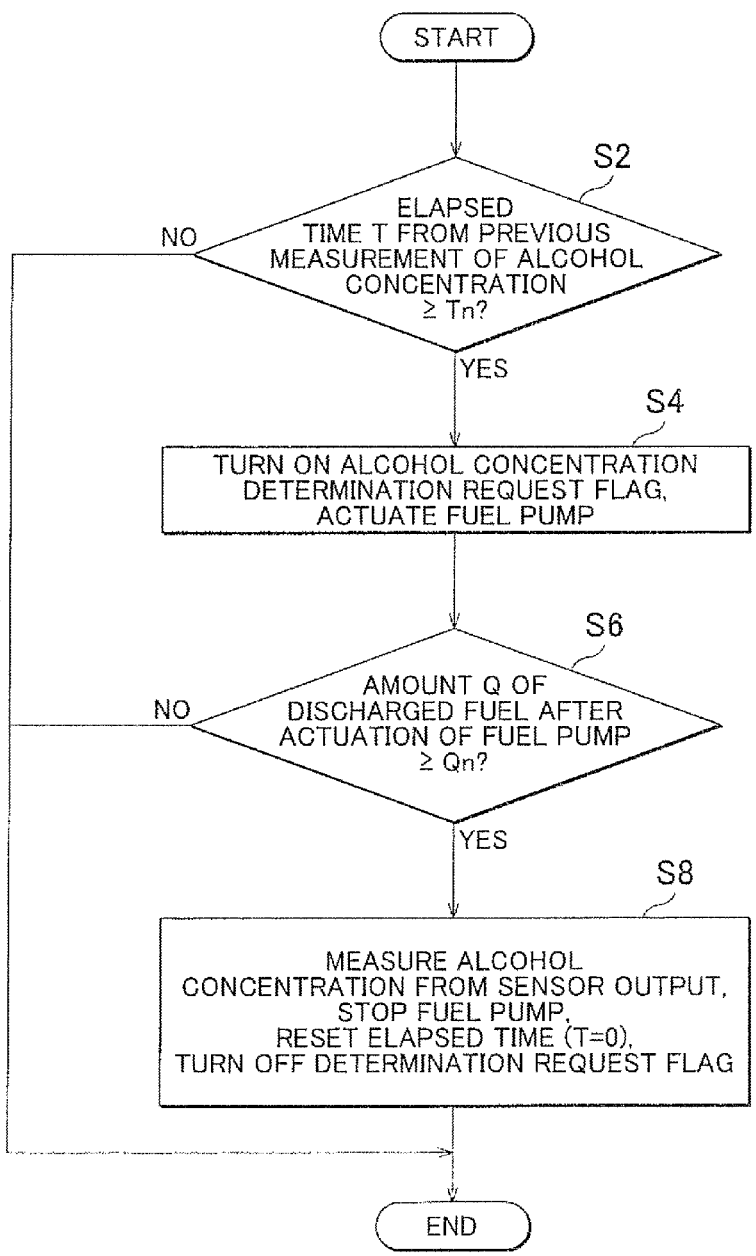

FUEL SUPPLY SYSTEM OF INTERNAL COMBUSTION ENGINE

CROSS REFERENCE TO RELATED APPLICATIONS

This application claims priority to Japanese Patent Application No. 2011-053827 filed on Mar. 11, 2011, which is incorporated herein by reference in its entirety including the specification, drawings and abstract.

BACKGROUND OF THE INVENTION

1. Field of the Invention

The invention relates to a fuel supply system of an internal combustion engine and, more particularly, to a fuel supply system equipped with a fuel property sensor for determining the property of the fuel that is used by the internal combustion engine.

2. Description of Related Art

Some of the internal combustion engines that are in practical use today are able to use plural kinds of fuels that are different in property. However, the property of the fuel to be used is not always known, and is not necessarily constant. For example, in the case of alcohol blended gasoline, there are plural kinds of alcohol blended gasoline that differ in alcohol concentration. Therefore, it sometimes happens that, at the time of refilling a fuel tank, a fuel whose alcohol concentration is different from that of the fuel in the fuel tank is fed. Therefore, an internal combustion engine that is expected to use a plurality of kinds of fuels having different properties needs to have means for detecting the property of the fuel that is being used.

The foregoing means to be employed may be a fuel property sensor. Japanese Patent Application Publication No. 2009-133273 (JP 2009-133273 A) discloses a fuel supply system equipped with an alcohol concentration sensor that is a type of fuel property sensor. In the system disclosed in this publication, a fuel flow path that connects a fuel pump and a fuel injector is provided with an alcohol concentration sensor. According to this system, it is possible to measure the alcohol concentration of the fuel that is supplied to the injector by the fuel pump, that is, of the fuel that is to be injected from the injector into the cylinder in a certain time.

By the way, the determination of the fuel property through the use of a fuel property sensor is sometimes performed for the purpose of detecting degradation of the fuel in the tank or introduction of an abnormal fuel into the tank. For that purpose, it is desirable that the fuel property be determined before the fuel is supplied to the internal combustion engine. However, in the case where the fuel flow path connecting a fuel pump and an injector is provided with a fuel property sensor as in the above-described system, determination of the property of an object fuel becomes possible only after the object fuel is supplied from the fuel pump to the injector. That is, the object fuel has to be actually used before the fuel property thereof can be determined. Besides, in the case where the vehicle in which the internal combustion engine is mounted is a hybrid vehicle (in particular, a plug-in hybrid vehicle), there are only a few opportunities at which the internal combustion engine is started and the fuel is consumed. Therefore, in the case where the fuel flow path connecting the fuel pump and the injector is provided with a fuel property sensor, there is a risk that detecting degradation of the fuel or the refueling with an abnormal fuel is impossible for a long period of time.

SUMMARY OF THE INVENTION

The invention provides a system capable of determining the property of a fuel injected from an injector during operation of an internal combustion engine and capable of early detecting the property of the fuel in a fuel tank during a stopped state of the internal combustion engine.

A first aspect of the invention relates to a fuel supply system of an internal combustion engine. This system includes: a pressure adjustment device provided on a fuel flow path that connects a fuel pump and an injector; a return flow path for returning a fuel discharged from the pressure adjustment device to a fuel tank; a fuel property sensor disposed in the return flow path; a fuel pump control portion that actuates the fuel pump at a predetermined programmed timing, when the internal combustion engine is in a stopped state; and a fuel property determination portion that determines a fuel property of the fuel in the fuel tank by using an output value of the fuel property sensor, when the fuel pump is actuated during the stopped state of the internal combustion engine.

According to the fuel supply system invention, during operation of the internal combustion engine, a portion of the fuel supplied to the injector flows into the return flow path, so that the property of the fuel injected from the injector can be determined by using the output value of the fuel property sensor. On the other hand, when the internal combustion engine is in the stopped state, the fuel pump is actuated at the predetermined programmed timing, so that after fuel is sent out from the fuel tank into the fuel flow path, fuel is discharged from the pressure adjustment device into the return flow path, and then returns into the fuel tank through the location at which the fuel property sensor is installed. Therefore, even when the internal combustion engine is in the stopped state, change of the property of the fuel in the fuel tank can be detected by using the output value of the fuel property sensor.

A second aspect of the invention relates to a fuel property determination method for a fuel supply system of an internal combustion engine. the fuel supply system includes: a pressure adjustment device provided on a fuel flow path that connects a fuel pump and an injector; and a return flow path for returning a fuel discharged from the pressure adjustment device to a fuel tank. The fuel property determination method includes: detecting a fuel property of the fuel in the return flow path; actuating the fuel pump at a predetermined timing, when the internal combustion engine is in a stopped state; and determining the fuel property of the fuel in the fuel tank by using the fuel property detected in the return flow path when the fuel pump is actuated during the stopped state of the internal combustion engine.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 2A and 2B are diagrams for describing a method adopted in the embodiment of the invention to estimate the fuel property of an injected fuel from an output value of a fuel property sensor; and FIG. 3 is a flowchart showing a routine for fuel property determination that is executed by an ECU when the internal combustion engine is in a stopped state in the embodiment of the invention.

DETAILED DESCRIPTION OF EMBODIMENTS

Figure 1:
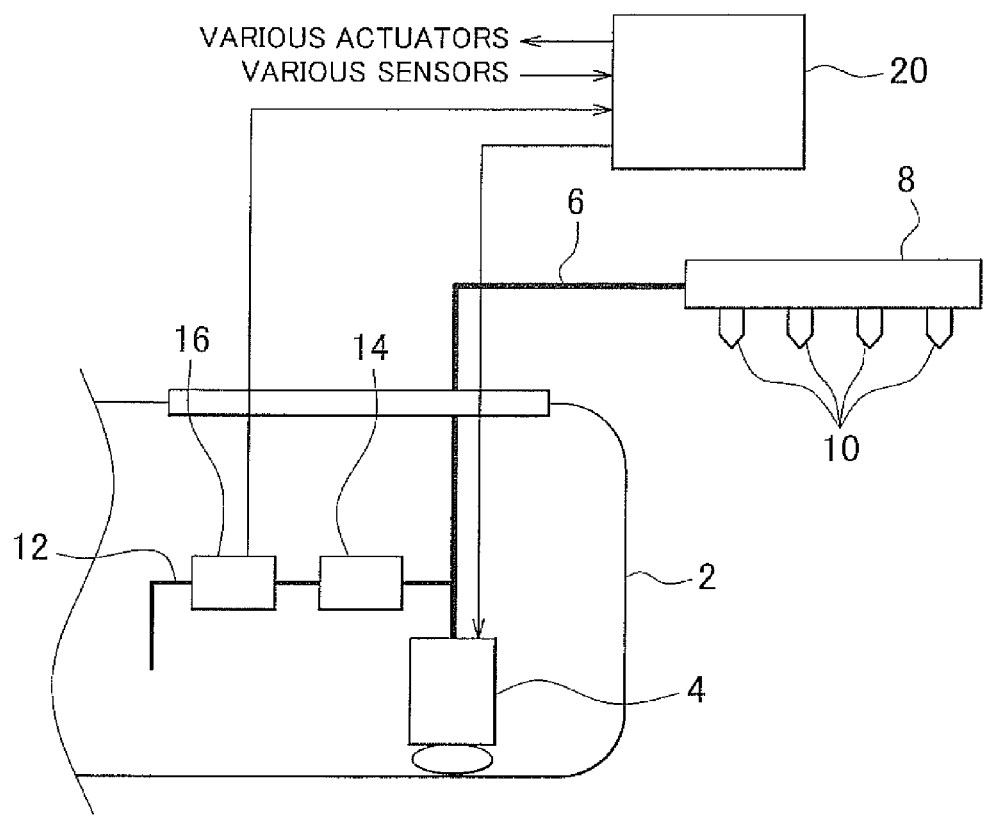
FIG. 1 is a schematic diagram showing a construction of a fuel supply system of an internal combustion engine in accordance with an embodiment of the invention.

A fuel supply system in accordance with an embodiment of the invention is applied to an internal combustion engine for a flexible-fuel vehicle (FFV) that is capable of using not only gasoline but also alcohol blended gasoline. FIG. 1 is a schematic diagram showing a construction of a fuel supply system of an internal combustion engine of the embodiment.

In the fuel supply system shown in FIG. 1, an electric-powered fuel pump 4 is provided within a fuel tank 2. From the fuel pump 4, a fuel flow path 6 extends to the outside of the fuel tank 2. The fuel flow path 6 is connected to a delivery pipe 8 that distributes fuel to injectors 10 of individual cylinders. Pressurized fuel sent out from the fuel pump 4 is supplied to the delivery pipe through the fuel flow path 6, and then is injected into the cylinders by the injectors 10. A return flow path 12 branches from an intermediate portion of the fuel flow path 6. A pressure regulator 14 is provided on an intermediate portion of the return flow path 12. The pressure regulator 14 is a pressure adjustment device for adjusting the fuel pressure within the fuel flow path 6. When the pressure regulator 14 opens, a portion of the pressurized fuel is returned to the fuel tank 2 via the return flow path 12. Furthermore, an alcohol concentration sensor 16, as a fuel property sensor, is disposed at a site on the return flow path downstream of the pressure regulator 14. The sensing method of the alcohol concentration sensor 16 is not limited. For example, sensors that measure alcohol concentration from electrostatic capacity, refraction index, transmittance, specific weight, density, etc. can be used. The output value of the alcohol concentration sensor 16, together with sensor outputs of other sensors, is taken up by an ECU 20 that is a control apparatus of the internal combustion engine.

The functions of the ECU 20 include a function of determining the fuel property of the fuel that is being used. The fuel property herein is a fuel property that can be determined by using the alcohol concentration sensor 16 and, concretely, refers to the alcohol concentration in the fuel. The output value of the alcohol concentration sensor 16 exhibits continuous changes relative to changes in the alcohol concentration, so that from the alcohol concentration in the fuel in use can be measured from the output value of the sensor 16. That is, in this embodiment, the alcohol concentration is used as a parameter related to the fuel property, and the value of the alcohol concentration is measured from the output value of the alcohol concentration sensor 16. If the alcohol concentration of the fuel in use is found, the amount of fuel injection form the injectors 10 can be adjusted to an appropriate amount. Besides, from the measured value of the alcohol concentration, it is possible to detect degradation of the fuel or the refueling with an abnormal fuel.

In order to adjust the fuel injection amount of the injectors 10 to an appropriate amount, it is necessary to know the alcohol concentration in the fuel injected from the injectors 10 instead of the alcohol concentration in the fuel present in the fuel tank 2. It requires a certain amount of time for the fuel sent out from the fuel tank 2 into the fuel flow path 6 by the fuel pump 4 to reach an injector 10. Therefore, if refueling changes the alcohol concentration in the fuel tank 2, there occurs at least temporarily a deviation between the alcohol concentration determined from the output value of the alcohol concentration sensor 16 and the alcohol concentration in the fuel injected from the injector 10. Therefore, the ECU 20 estimates the alcohol concentration in the fuel that is about to be immediately injected from an injector 10 by a method described below, and determines the fuel injection amount of the injector 10 by using the estimated value of the alcohol concentration.

FIGS. 2A and 2B are diagrams for describing a method that is adopted in this embodiment to estimate the alcohol concentration in the fuel that is about to be immediately injected, from the output value of the alcohol concentration sensor 16. As shown in FIGS. 2A and 2B, according to the function of the ECU 20 that estimates the alcohol concentration of the fuel that is about to be immediately injected, the fuel flow path 6 between the branching point of the return flow path 12 to a site slightly upstream of the injectors 10 is virtually divided into n−1 number of cells of equal volumes. The volume per cell (hereinafter, unit volume) can be expressed as V/(n−1), where V is the volume of the fuel flow path from the branching point of the return flow path 12 to the site slightly upstream of the injectors 10. The ECU 20 has a total of n+1 number of storage portions corresponding to a total of n+1 number of regions that include the n−1 number of cells, an inlet region that corresponds to the branching point of the return flow path 12 and an outlet region that corresponds to the location where the injectors 10 are installed. Each storage portion stores a value of the alcohol concentration in a corresponding one of the cells.

FIG. 2A shows a distribution of the alcohol concentrations $E_t(i)$ in the individual regions at a certain time point t. In FIGS. 2A and 2B, "i" is a number assigned to each region, with "0" and "n" corresponding to the inlet region and the outlet region, respectively, and numbers "1" to "n−1" corresponding to the individual cells. Therefore, $E_t(0)$ is the alcohol concentration in the inlet region, and $E_t(n)$ is the alcohol concentration in the outlet region. $E_t(1)$ to $E_t(n-1)$ mean the alcohol concentrations in the individual cells. Among the alcohol concentrations $E_t(i)$, the alcohol concentration $E_t(0)$ is provided with an input value obtained by converting the output value of the alcohol concentration sensor 16 into an alcohol concentration. Besides, the alcohol concentration $E_t(n)$ in the outlet region is used for the calculation of the fuel injection amount of the injector 10.

FIG. 2B shows a distribution of alcohol concentrations $E_{t+1}(i)$ in the individual regions at a subsequent time point t+1 at which the fuel injection by the injector 10 has just consumed an amount of fuel that is equal to one unit volume. When one unit volume of fuel is consumed, the value of the alcohol concentration stored in each storage portion is shifted, as shown by arrowed lines in FIGS. 2A and 2B, to a storage portion that corresponds to the next cell toward the injector side. Concretely, the alcohol concentration $E_t(i)$ in the ith cell at the time point t equals the alcohol concentration $E_{t+1}(i+1)$ in the (i+1)th cell at the time point t+1. Besides, the alcohol concentration $E_t(n-1)$ in the (n−1)th cell at the time point t is used as the alcohol concentration $E_{t+1}(n)$ in the outlet region at the time point t+1. On the other hand, the storage portion that corresponds to the 1st cell, that is, the nearest cell to the alcohol concentration sensor 16 receives input of an average alcohol concentration in the inlet region from the time point t to the time point t+1. For calculation of the average concentration, the following expressions are used.

$$E\mathrm{sum}_j = E\mathrm{sum}_{j-1} + E(0) * \Delta q \qquad \text{Expression 1}$$

$$Q_j = Q_{j-1} + \Delta q \qquad \text{Expression 2}$$

$$E\mathrm{avg}_t = E\mathrm{sum}_j / Q_j \text{ (where } Q_j \geq V/(n-1)\text{)} \qquad \text{Expression 3}$$

In Expression 1, "j" means the sequence number of each time step when the ECU 20 executes a programmed process. Furthermore, E(0) is a value obtained by converting the output value of the alcohol concentration sensor 16 into an alcohol concentration, and Δq is the amount of fuel consumed for the fuel injection from an injector 10 between the previous time step j−1 to the present time step j. Therefore, $Esumm_j$ means a sum of multiplication products of the alcohol concentration E(0) and the amount of consumed fuel Δq during the period up to the time step j. In Expression 2, $Q_j$ means a sum of the amounts of consumed fuel Δq during the period up to the time step j. In Expression 3, $Eavg_t$ is an average alcohol concentration in the inlet region that is to be input to the storage portion that corresponds to the 1st cell at the time point t+1. The average alcohol concentration $Eavg_t$ is calculated by dividing by $Q_j$ in Expression 2 the $Esum_j$ obtained at the time point when $Q_j$ becomes equal to or greater than V/(n−1). Incidentally, the value j that shows the sequence number of each time step is reset to 1, which is an initial value, every time $Q_j$ in Expression 2 reaches the unit volume, and after that, the value J is incremented again at every time step.

The ECU 20, according to the above-described method, calculates changes in the alcohol concentration distribution in the fuel flow path 6 moment by moment during operation of the internal combustion engine, and uses the calculation results to estimate the alcohol concentration in the fuel that is about to be immediately injected from each injector 10. Incidentally, when the internal combustion engine is in the stopped state or the fuel-cut is being executed, the fuel consumption ceases due to stop of the fuel injection from the injectors 10, and therefore the value of the alcohol concentration stored in each storage portion is retained instead of being shifted to the storage portion that corresponds to the next cell toward the injector side. That is, the alcohol concentration distribution data immediately before the fuel injection from the injectors 10 stops is retained as it is. Besides, even if there is any change in the output value of the alcohol concentration sensor 16 during that state, the change will not affect the alcohol concentration distribution data as long as the value of Δq in Expression 1 is zero. At the time of restart of operation of the internal combustion engine or resumption from the fuel-cut, the retained alcohol concentration distribution data is used to calculate the amount of fuel injection from an injector 10.

The above-described process is performed during operation of the internal combustion engine for the purpose of adjusting the fuel injection amount of each injector 10 to an appropriate amount. However, if the alcohol concentration is measured for the purpose of detecting degradation of the fuel inside the fuel tank 2 or the refueling of the fuel tank 2 with an abnormal fuel, the above-described process must be performed when the internal combustion engine is in the stopped state. That is because there is high possibility that degradation of fuel progresses or the fuel tank is refueled with an abnormal fuel when the internal combustion engine is stopped for a long time.

FIG. 3 is a flowchart showing a routine for measurement of the alcohol concentration that the ECU 20 executes when the internal combustion engine is in the stopped state. According to this routine, firstly in step S2, it is determined whether the elapsed time T from the previous time point of measurement of the alcohol concentration has reached a predetermined reference time Tn. If the elapsed time T has not reached the reference time Tn, this routine is ended without any other processing. This routine is repeated on a regular cycle while the internal combustion engine is in the stopped state.

When the elapsed time T has reached the reference time Tn, the process of step S4 is carried out. In step S4, an alcohol concentration determination request flag is turned on, and the fuel pump 4 is actuated. Since the fuel pump 4 is of the electric type, the fuel pump 4 can be actuated at an arbitrary timing regardless whether the internal combustion engine is operating or in the stopped state. After the fuel pump 4 is actuated, the fuel in the fuel tank 2 is sent out into the fuel flow path 6. However, since the fuel injection from the injectors 10 is in the stopped state, the fuel sent out into the fuel flow path 6 is discharged from the pressure regulator 14 into the return flow path 12, and is returned into the fuel tank 2 through the location at which the alcohol concentration sensor 16 is installed.

Subsequently in step S6, it is determined whether the amount of discharged fuel Q following actuation of the fuel pump 4 has reached a predetermined reference amount Qn. The reference amount Qn is set at a value that is greater than the volume of the flow path from the outlet of the fuel pump 4 to the location at which the alcohol concentration sensor 16 is installed. That is, in step S6, it is determined whether the fuel pumped from the fuel tank 2 has reached the installation location of the alcohol concentration sensor 16. If the amount of discharged fuel Q has not reached the reference amount Qn, the routine is ended without any further processing.

When the amount of discharged fuel Q has reached the reference amount Qn, the process of step S8 is carried out. In step S8, the alcohol concentration sensor 16 is powered on. Then, from the output value of the alcohol concentration sensor 16, the alcohol concentration in the fuel in the fuel tank 2 is measured. If the measured alcohol concentration exhibits an abnormal value, it can be estimated that the fuel has aged and degraded or that an abnormal fuel has been supplied into the fuel tank 2. In that case, it is desirable to turn on an MIL to inform the driver so. Incidentally, since the amount of consumed fuel Δq is zero during the period of the execution of this process, no change is caused in the aforementioned alcohol concentration distribution data by the value output by the alcohol concentration sensor 16 during this period. After the measurement ends, the alcohol concentration sensor 16 is powered off and the fuel pump 4 is stopped. Besides, the value of the aforementioned elapsed time T is reset to zero, and the alcohol concentration determination request flag is turned off again. Then, the routine is ended.

Due to execution of the routine described above, even in the case where the internal combustion engine is in the stopped state, degradation of the fuel or the refueling with an abnormal fuel can be detected by using the output value of the alcohol concentration sensor 16. Besides, because the forced actuation of the fuel pump 4 is not performed until a fixed time elapses following the previous measurement time point, the deterioration of fuel economy that results from useless actuation of the fuel pump 4 can be avoided.

Incidentally, the reference time Tn that is used in the determination in step S2 can be set at an arbitrary time. However, if the reference time Tn is excessively long, the detection of degradation of the fuel may become late. Conversely, if the time is excessively short, frequent actuation of the fuel pump 4 may result, and the fuel economy may deteriorate. Therefore, it is preferable that the reference time Tn be set according to the degradation characteristic of the fuel that is assumed to be used. If the use of a fuel whose proneness to degradation changes depending on temperature is assumed, the fuel temperature in the fuel tank 2 (e.g., an average temperature over a certain time) is measured, and the reference time Tn may be altered according to the measured value.

Besides, the reference time Tn may also be altered according to the operation time of the internal combustion engine or the travel distance of the vehicle.

The construction of the invention is summarized below.

A first construction relates to a fuel supply system of an internal combustion engine. This system includes: a pressure adjustment device attached to a fuel flow path that connects a fuel pump and an injector; a return flow path for returning a fuel discharged from the pressure adjustment device to a fuel tank; a fuel property sensor disposed in the return flow path; a fuel pump control portion that actuates the fuel pump at a predetermined programmed timing, when the internal combustion engine is in a stopped state; and a fuel property determination portion that determines a fuel property of the fuel in the fuel tank by using an output value of the fuel property sensor, when the fuel pump is actuated during the stopped state of the internal combustion engine.

According to this construction, during operation of the internal combustion engine, a portion of the fuel supplied to the injector flows into the return flow path, so that the property of the fuel injected from the injector can be determined by using the output value of the fuel property sensor. On the other hand, when the internal combustion engine is in the stopped state, the fuel pump is actuated at the predetermined programmed timing, so that after fuel is sent out from the fuel tank into the fuel flow path, fuel is discharged from the pressure adjustment device into the return flow path, and then returns into the fuel tank through the installation location of the fuel property sensor. Therefore, even when the internal combustion engine is in the stopped state, change of the property of the fuel in the fuel tank can be detected by using the output value of the fuel property sensor.

In a second construction based on the first construction, the fuel pump control portion actuates the fuel pump when elapsed time from a previous time point of determination of the fuel property has reached a predetermined reference time.

According to this construction, the forced actuation of the fuel pump is not performed until a certain time elapses from the previous time point of determination of the fuel property. Therefore, the degradation of fuel economy that results from useless actuation of the fuel pump can be avoided.

In a third construction based on the second construction, the reference time is set according to a degradation characteristic of the fuel that is assumed to be used.

A fourth construction based on the third construction, the reference time is corrected according to temperature of the fuel in the fuel tank.

In a fifth construction based on the first construction, the fuel supply system further includes: a parameter value distribution data store portion that stores data that shows how values of a parameter related to the fuel property is distributed in the fuel flow path from the fuel property sensor to the injector; a fuel injection amount determination portion that determines amount of fuel injection from the injector by using the parameter value distribution data; and a parameter value distribution data update portion that updates the parameter value distribution data by using the output value of the fuel property sensor and the amount of fuel injection from the injector determined by the fuel injection amount determination portion, wherein the parameter value distribution data update portion stops update of the parameter value distribution data that is performed by using the output value of the fuel property sensor during a stop of fuel injection from the injector, and starts again the update of the parameter value distribution data that is performed by using the output value of the fuel property sensor after the fuel injection from the injector is started again.

According to this construction, during the stop of the fuel injection from the injector, even if the forced actuation of the fuel pump is performed, the update of the parameter value distribution data through the use of the output value of the fuel property sensor remains stopped. This makes it possible to avoid occurrence of deviation between the actual parameter value distribution in the fuel flow path and the parameter value distribution data for use for calculation of the amount of fuel injection.

In a sixth construction based on the fifth construction, the parameter value distribution data store portion has a plurality of storage portions that correspond to a plurality of cells into which the fuel flow path from the fuel property sensor to the injector is virtually divided so that the cells have equal volumes, and the parameter value distribution data store portion is configured so that each of the storage portions stores a value of the parameter for a corresponding one of the cells. Furthermore, the fuel injection amount determination portion is configured so that a value of the parameter stored by the storage portion that corresponds to the cell that is nearest to the injector is used for determination of the amount of fuel injection. Still further, the parameter value distribution data update portion has: a portion that calculates a value of the parameter at the installation location of the fuel property sensor (hereinafter, termed the initial value) by using the output value provided by the fuel property sensor while an amount of fuel corresponding to a volume of each cell is consumed for the fuel injection from the injector; and a portion that updates the value of the parameter stored by each storage portion by shifting the value of the parameter to a storage portion that corresponds to a next cell toward the injector, and records the initial value in a storage portion that corresponds to the cell that is nearest to the fuel property sensor, when the amount of fuel corresponding to the volume of each cell is consumed for the fuel injection from the injector.

According to this construction, the values of the parameter stored by the storage portions are shifted on condition that the amount of fuel corresponding to the volume of each cell is consumed for the fuel injection from the injector. Therefore, during the stop of the fuel injection from the injector, even if the forced actuation of the fuel pump is performed, the parameter value distribution data is maintained as it is.

The invention is not limited to the foregoing embodiments. The invention can be carried out with various modifications from the foregoing embodiments, without departing from the gist of the invention. For example, although in the foregoing embodiments, the alcohol concentration sensor is used as a fuel property sensor, it is appropriate to determine what sensor to use as a fuel property sensor according to the fuel to be used. For example, if the gasoline for use in a gasoline engine varies in quality, a sensor that detects whether the fuel is a heavy fuel or a light fuel or a sensor that detects the octane number of the fuel may be used.

What is claimed is:

1. A fuel supply system of an internal combustion engine, comprising:
   a pressure adjustment device provided on a fuel flow path that connects a fuel pump and an injector;
   a return flow path for returning a fuel discharged from the pressure adjustment device to a fuel tank;
   a fuel property sensor disposed in the return flow path;
   a fuel pump control portion that actuates the fuel pump at a predetermined programmed timing, when the internal combustion engine is in a stopped state; and
   a fuel property determination portion that determines a fuel property of the fuel in the fuel tank by using an output value of the fuel property sensor, when the fuel pump is actuated during the stopped state of the internal combustion engine.

2. The fuel supply system according to claim 1, wherein the fuel pump control portion actuates the fuel pump when elapsed time from a previous time point of determination of the fuel property has reached a predetermined reference time.

3. The fuel supply system according to claim 2, wherein the predetermined reference time is set according to a degradation characteristic of the fuel that is assumed to be used.

4. The fuel supply system according to claim 3, wherein the predetermined reference time is corrected according to temperature of the fuel in the fuel tank.

5. A fuel property determination method in a fuel supply system of an internal combustion engine, wherein
the fuel supply system includes:
a pressure adjustment device provided on a fuel flow path that connects a fuel pump and an injector; and
a return flow path for returning a fuel discharged from the pressure adjustment device to a fuel tank,
the fuel property determination method comprising:
detecting a fuel property of the fuel in the return flow path;
actuating the fuel pump at a predetermined timing, when the internal combustion engine is in a stopped state; and
determining the fuel property of the fuel in the fuel tank by using the fuel property detected in the return flow path when the fuel pump is actuated during the stopped state of the internal combustion engine.

6. A fuel supply system of an internal combustion engine, comprising:
a pressure adjustment device provided on a fuel flow path that connects a fuel pump and an injector;
a return flow path for returning a fuel discharged from the pressure adjustment device to a fuel tank;
a fuel property sensor disposed in the return flow path;
a fuel pump control portion that actuates the fuel pump at a predetermined programmed timing, when the internal combustion engine is in a stopped state; and
a fuel property determination portion that determines a fuel property of the fuel in the fuel tank by using an output value of the fuel property sensor, when the fuel pump is actuated during the stopped state of the internal combustion engine;
a parameter value distribution data store portion that stores data that shows how values of a parameter related to the fuel property is distributed in the fuel flow path from the fuel property sensor to the injector;
a fuel injection amount determination portion that determines amount of fuel injection from the injector by using the parameter value distribution data; and
a parameter value distribution data update portion that updates the parameter value distribution data by using the output value of the fuel property sensor and the amount of fuel injection from the injector determined by the fuel injection amount determination portion, wherein
the parameter value distribution data update portion stops update of the parameter value distribution data that is performed by using the output value of the fuel property sensor during a stop of fuel injection from the injector, and starts again the update of the parameter value distribution data that is performed by using the output value of the fuel property sensor after the fuel injection from the injector is started again.

7. The fuel supply system according to claim 6, wherein:
the parameter value distribution data store portion has a plurality of storage portions that correspond to a plurality of cells into which the fuel flow path from the fuel property sensor to the injector is virtually divided so that the cells have equal volumes, and the parameter value distribution data store portion is configured so that each of the storage portions stores a value of the parameter for a corresponding one of the cells;
the fuel injection amount determination portion is configured so that the value of the parameter stored by the storage portion that corresponds to the cell that is nearest to the injector is used for determination of the amount of fuel injection; and
the parameter value distribution data update portion has
an initial value calculation portion that calculates an initial value that is a value of the parameter at an installation location of the fuel property sensor by using the output value provided by the fuel property sensor while an amount of fuel corresponding to a volume of each cell is consumed for the fuel injection from the injector, and
an initial value recording portion that updates the value of the parameter stored by each storage portion by shifting the value of the parameter to a storage portion that corresponds to a next cell toward the injector, and records the initial value in a storage portion that corresponds to the cell that is nearest to the fuel property sensor, when the amount of fuel corresponding to the volume of each cell is consumed for the fuel injection from the injector.

* * * * *